(12) United States Patent
Wright et al.

(10) Patent No.: US 8,413,725 B2
(45) Date of Patent: Apr. 9, 2013

(54) SUBSEA FLUID SEPARATOR

(76) Inventors: David C Wright, Humble, TX (US);
Jeffery Wilbert Dufrene, Thibodaux, LA (US)

(*) Notice: Subject to any disclaimer, the term of this patent is extended or adjusted under 35 U.S.C. 154(b) by 134 days.

(21) Appl. No.: 12/978,486

(22) Filed: Dec. 24, 2010

(65) Prior Publication Data

US 2011/0155384 A1 Jun. 30, 2011

Related U.S. Application Data

(60) Provisional application No. 61/290,168, filed on Dec. 24, 2009.

(51) Int. Cl.
*E21B 7/12* (2006.01)
(52) U.S. Cl. .................. 166/357; 166/105.1; 166/54
(58) Field of Classification Search .................. 166/357, 166/386, 316, 328, 332.3, 193, 54, 344, 335
See application file for complete search history.

(56) References Cited

U.S. PATENT DOCUMENTS

| | | | |
|---|---|---|---|
| 1,628,900 A * | 5/1927 | Neilsen ................. | 166/105.5 |
| 1,947,923 A * | 2/1934 | Schweitzer ............. | 73/196 |
| 2,145,425 A * | 1/1939 | McKeever ............. | 96/206 |
| 2,352,256 A * | 6/1944 | De Motte .............. | 48/192 |
| 2,665,645 A * | 1/1954 | Wells ................... | 166/105.1 |
| 2,817,689 A * | 12/1957 | White .................. | 585/501 |
| 3,606,584 A * | 9/1971 | Sizer ................... | 417/109 |
| 4,042,014 A * | 8/1977 | Scott ................... | 166/367 |
| 4,054,522 A * | 10/1977 | Pinkerton ............. | 210/188 |
| 4,173,533 A | 11/1979 | Williams | |
| 4,261,795 A * | 4/1981 | Reilly .................. | 202/118 |
| 4,286,970 A * | 9/1981 | Cankurt et al. ........ | 48/87 |
| 4,290,528 A * | 9/1981 | Stekly ................. | 209/223.1 |

(Continued)

FOREIGN PATENT DOCUMENTS

| GB | 2369787 A | 6/2002 |
|---|---|---|
| WO | WO 2008-144338 | 11/2008 |

OTHER PUBLICATIONS

PCT Notification of Transmittal of the International Search Report and the Written Opinion of the International Searching Authority, or the Declaration; Jun. 29, 2011; International Application No. PCT/US2010/062107: International Searching Authority, Korean Intellectual Property Office.

(Continued)

*Primary Examiner* — Thomas Beach
*Assistant Examiner* — Aaron Lembo
(74) *Attorney, Agent, or Firm* — The Compton Law Firm, P.C.; Scott D. Compton

(57) ABSTRACT

The present application is directed to a subsea separator. The subsea separator suitably comprises (a) a housing having an inlet for receiving a fluid mixture, a non-gaseous fluid outlet located along the housing at a point lower than the inlet, and a gas outlet located along the housing at a point higher than the inlet; (b) a deflector means located within the housing for acting on fluid entering the housing; and (c) a sealing means in communication with the gas outlet for preventing non-gaseous fluid from exiting the housing through the gas outlet, the sealing means being operationally configured to open and seal the gas outlet based on the volume of non-gaseous fluid within the separator; wherein the separator is operationally configured to operate under a differential pressure including a greater external hydrostatic pressure than internal pressure and vice versa.

20 Claims, 4 Drawing Sheets

U.S. PATENT DOCUMENTS

| | | | | |
|---|---|---|---|---|
| 4,305,822 | A | * | 12/1981 | Eimer et al. .................. 210/405 |
| 4,323,198 | A | * | 4/1982 | Turner et al. ...................... 241/5 |
| 4,473,036 | A | * | 9/1984 | Carlson ...................... 122/479.2 |
| 5,082,556 | A | * | 1/1992 | Reese .............................. 96/159 |
| 5,474,601 | A | | 12/1995 | Choi |
| 5,482,117 | A | | 1/1996 | Kolpak |
| 5,866,000 | A | * | 2/1999 | Yeh ............................... 210/295 |
| 6,082,452 | A | | 7/2000 | Shaw |
| 6,138,758 | A | | 10/2000 | Shaw |
| 6,179,054 | B1 | * | 1/2001 | Stewart ...................... 166/105.5 |
| 6,238,569 | B1 | | 5/2001 | Favret |
| 6,651,745 | B1 | | 11/2003 | Lush |
| 7,013,978 | B2 | | 3/2006 | Appleford |
| 7,066,248 | B2 | | 6/2006 | Howell |
| 7,210,530 | B2 | | 5/2007 | Lush |
| 7,520,989 | B2 | | 4/2009 | Ostergaard |
| 2003/0106714 | A1 | | 6/2003 | Smith |
| 2004/0099422 | A1 | | 5/2004 | Lush |
| 2004/0200621 | A1 | | 10/2004 | Ostergaard |
| 2004/0244983 | A1 | | 12/2004 | Appleford |
| 2004/0251019 | A1 | | 12/2004 | Howell |
| 2005/0150827 | A1 | | 7/2005 | Hopper |
| 2008/0282776 | A1 | | 11/2008 | Loeb |
| 2008/0282777 | A1 | | 11/2008 | Loeb |
| 2009/0211764 | A1 | | 8/2009 | Fielding |
| 2011/0158824 | A1 | * | 6/2011 | Wright et al. ................... 417/53 |

OTHER PUBLICATIONS

PCT Notification of Transmittal of the International Search Report and the Written Opinion of the International Searching Authority, or the Declaration. Sep. 30, 2011; International Application No. PCT/US2010/062109; International Searching Authority, Korean Intellectual Property Office.

* cited by examiner

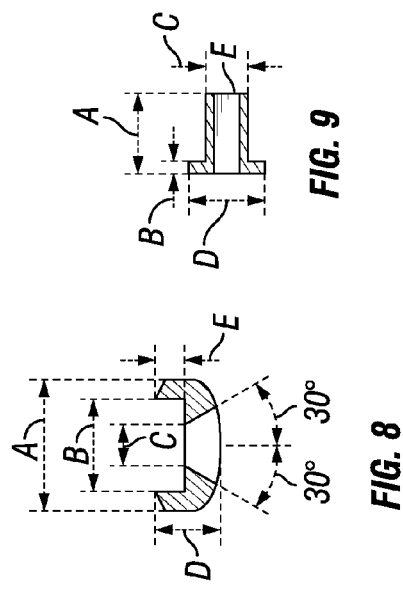
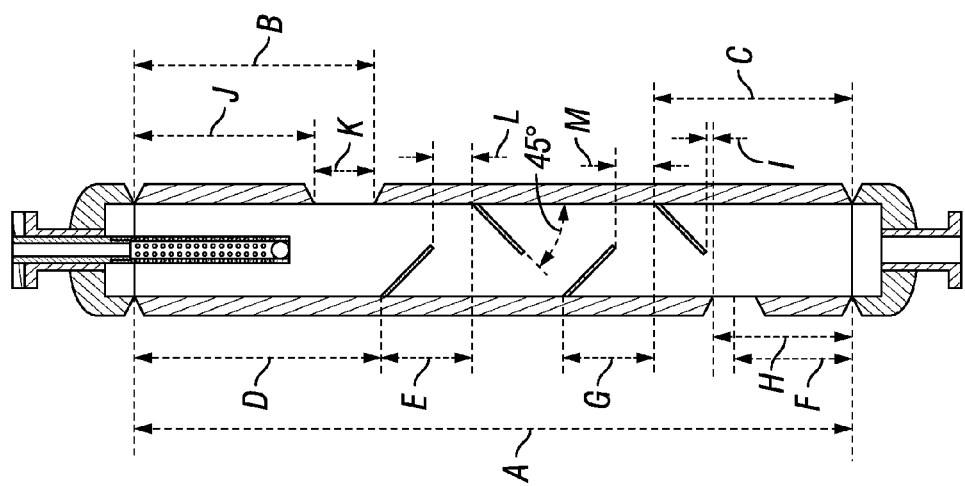
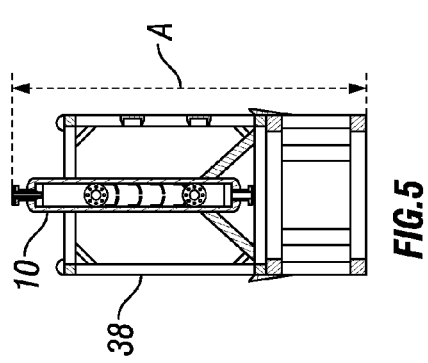
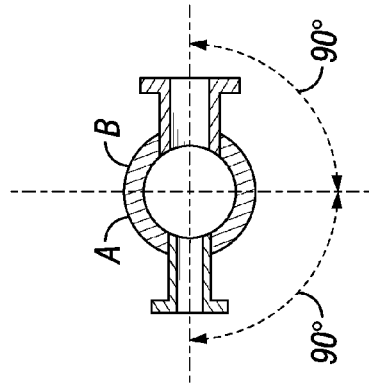

SUBSEA FLUID SEPARATOR

CROSS-REFERENCE TO RELATED APPLICATIONS

The application is entitled to the benefit of the filing date of the prior-filed provisional application No. 61/290,168, filed on Dec. 24, 2009.

STATEMENT REGARDING FEDERALLY SPONSORED RESEARCH OR DEVELOPMENT

Not applicable.

FIELD OF THE APPLICATION

The application relates generally to separating fluids in subsea environments.

BACKGROUND

In subsea operations, it may be desirable to separate a fluid mixture into two or more separate fluid streams prior to conveying the fluid streams to the surface or to a subsea locale. A fluid separator operationally configured to separate a fluid mixture into two or more separate fluid streams, including gas and non-gaseous fluid streams, under subsea external hydrostatic pressure is desired.

SUMMARY

The present application is directed to a subsea separator. The subsea separator suitably comprises (a) a housing having an inlet for receiving a fluid mixture, a non-gaseous fluid outlet located along the housing at a point lower than the inlet, and a gas outlet located along the housing at a point higher than the inlet; (b) a deflector means located within the housing for acting on fluid entering the housing; and (c) a sealing means in communication with the gas outlet for preventing non-gaseous fluid from exiting the housing through the gas outlet, the sealing means being operationally configured to open and seal the gas outlet based on the volume of non-gaseous fluid within the separator; wherein the separator is operationally configured to operate under a differential pressure including a greater external hydrostatic pressure than internal pressure and vice versa.

The present application is also directed to a deep water separator for separating gas from a liquid/gas mixture. The separator suitably comprises (a) a cylindrical housing having a substantially uniform wall thickness; (b) a first end cap for sealing the housing at a first end and a second end cap for sealing the periphery of the housing at a second end, the second end cap having a gas outlet there through; (c) a fluid inlet located along the housing for receiving a liquid/gas mixture there through; (d) a non-gaseous fluid outlet located along the housing at a point lower than the fluid inlet, the non-gaseous fluid outlet being effective for discharging non-gaseous fluid there through; (e) a deflector means within the housing, the deflector means being located between the fluid inlet and the non-gaseous fluid outlet; and (f) a ball valve assembly fluidly connected to the gas outlet operationally configured to open and seal the gas outlet based on the volume of non-gaseous fluid within the separator.

The present application is also directed to a method of separating gas from a liquid/gas mixture in a subsea environment at an external hydrostatic pressure up to about 463 bar (about 6708 psi). Suitably, the method comprises the steps of (a) providing a separator including (1) a housing having an inlet for receiving a liquid/gas mixture, a non-gaseous fluid outlet located along the housing at a point lower than the inlet, and a gas outlet located along the housing at a point higher than the inlet; (2) a deflector means located within the housing at a point lower than the inlet for acting on the liquid/gas mixture entering the housing; and (3) a sealing means in communication with the gas outlet for preventing non-gaseous fluid from exiting the housing through the gas outlet, the sealing means being operationally configured to open and seal the gas outlet based on the volume of non-gaseous fluid within the separator; wherein the separator is operationally configured to operate under a differential pressure including a greater external hydrostatic pressure than internal pressure and vice versa; (b) installing the separator subsea to a depth producing an external hydrostatic pressure up to about 463 bar (about 6708 psi); (c) fluidly connecting the separator to (1) a fluid source containing a liquid/gas mixture and (2) a pump means; and (d) receiving a fluid/gas mixture from the fluid source wherein the fluid/gas mixture contacts the deflector means to separate gas out of the fluid/gas mixture.

BRIEF DESCRIPTION OF THE FIGURES

FIG. 5 illustrates a side elevational view of the separator attached to a frame.

FIG. 6 illustrates a sectional view of a simplified embodiment of a separator.

FIG. 7 illustrates a top sectional view of the separator of FIG. 6.

FIG. 8 illustrates a side sectional view of an end cap of the separator of FIG. 6.

FIG. 9 illustrates a sectional view of the non-gaseous fluid outlet of the separator of FIG. 6.

FIG. 10 illustrates a sectional view of a fluid inlet of the separator of FIG. 6.

FIG. 11 illustrates a sectional view of a filter assembly of the fluid inlet of FIG. 10.

BRIEF DESCRIPTION

Figure 1:
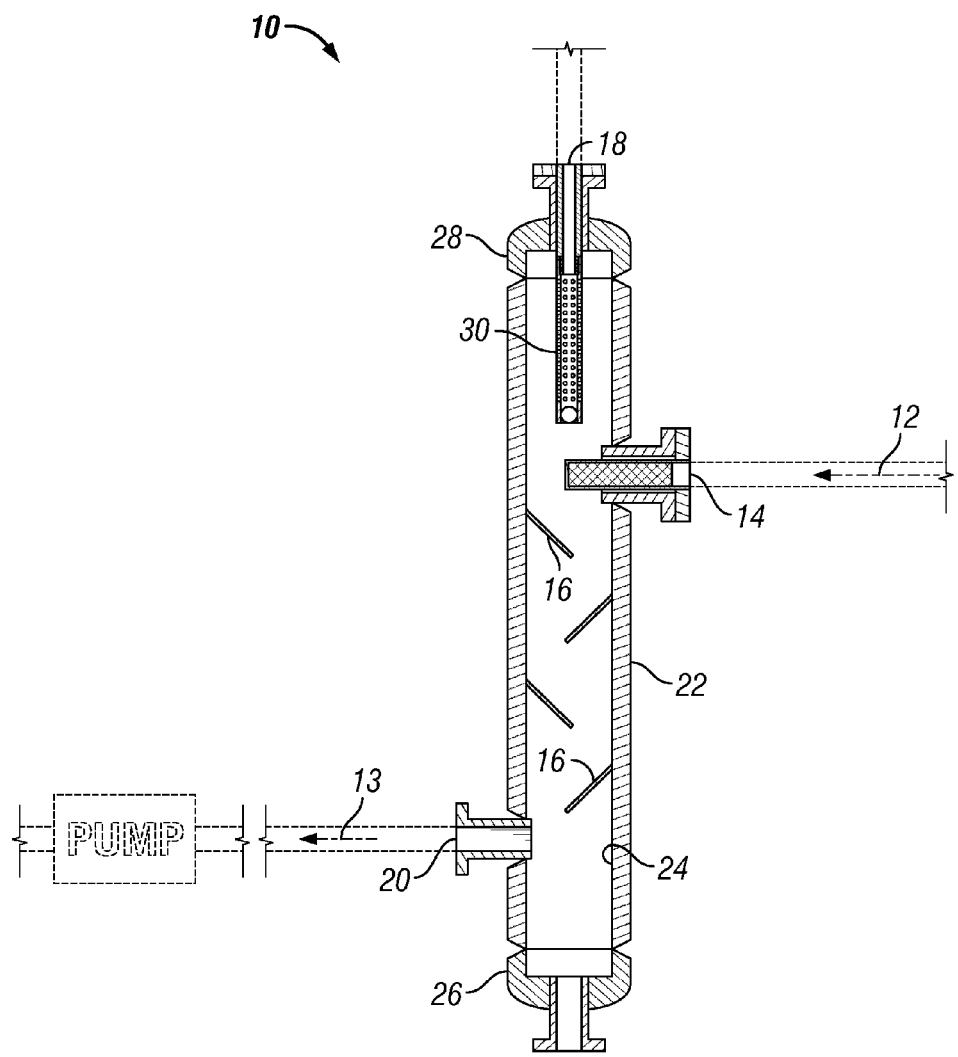
FIG. 1 illustrates a sectional view of a simplified embodiment of the present separator.

It has been discovered that a fluid separator may effectively separate a fluid mixture into two or more fluid streams in subsea environments wherein the internal pressure of the separator is less than the external hydrostatic pressure, and vice versa. It has also been discovered that a fluid separator may be installed in deep water or ultra deep water environments and employed to separate gas from liquid/gas fluid streams, the separated gas being discharged via a gas outlet of the separator and non-gaseous fluid being discharged via a separate non-gaseous outlet. In the event the separator fills with non-gaseous fluid, the separator is operationally configured to prevent non-gaseous fluid from exiting the separator through the gas outlet. Heretofore, such a desirable achievement has not been considered possible, and accordingly, the separator and method of this application measure up to the dignity of patentability and therefore represents a patentable concept.

Before describing the invention in detail, it is to be understood that the present separator and method are not limited to particular embodiments. It is also to be understood that the terminology used herein is for the purpose of describing particular embodiments only, and is not intended to be limiting. As used in this specification and the appended claims, the phrase "fluid" refers to flowable gaseous fluids, flowable non-gaseous fluids, and combinations thereof. The term "fresh water" refers to an aqueous solution having a relatively low concentration of dissolved salts. The terms "install," "installation," and the like refer to submersing the separator to a desired depth whereby the separator is releasably attached to fluid conduits for receiving and discharging fluid. The phrase "deep water" includes subsea depths from about 914 m to about 2286 m (about 3,000 feet to about 7,500 feet). The phrase "ultra deep water" includes subsea depths of about 2286 m or more (about 7,500 feet or more).

In one aspect, the application provides a subsea separator operationally configured to separate gas from a liquid/gas mixture and discharge gases and liquids separately.

In another aspect, the application provides a subsea separator operationally configured to separate gas from non-gaseous fluid prior to the gas and non-gaseous fluid being conveyed toward the surface.

In another aspect, the application provides a subsea separator in fluid communication with a subsea pump, the separator being operationally configured to discharge substantially gas-free fluids to the pump.

In another aspect, the application provides a subsea separator in fluid communication with a subsea pump, the separator being operationally configured to prevent the discharge of non-gaseous fluid via a gas outlet of the separator.

In another aspect, the application provides a subsea separator including a cylindrical housing constructed from metal alloy, the housing having a substantially uniform wall thickness.

In another aspect, the application provides a subsea separator including a cylindrical housing constructed from carbon steel, the housing having a substantially uniform wall thickness of about 7.62 cm (3.0 inches) or more.

In another aspect, the application provides a subsea separator qualified for depths of about 2195 meters (about 7200 feet) according to standards established by the American Petroleum Institute ("API").

In another aspect, the application provides a means of acting on a target fluid mixture in a subsea environment to separate gas from the target fluid prior to conveying the separated fluids to one or more surface or subsea locales.

In another aspect, the application provides a subsea separator having a sealing means operationally configured to seal the separator according to the volume of non-gaseous fluid within the separator.

In another aspect, the application provides a separator that may be fabricated to operate at subsea depths up to about 4572 meters (about 15,000 feet) and/or an external hydrostatic pressure of about 463 bar (about 6708 psi).

In another aspect, the application provides a separator for separating gas from a liquid/gas mixture, the separator being operational at subsea depths up to about 4572 meters (about 15,000 feet) and/or an external hydrostatic pressure of about 463 bar (about 6708 psi).

In another aspect, the application provides a subsea fluid separator that may be built to scale.

In another aspect, the application provides a subsea separator that may be tethered to a surface vessel. Alternatively, the subsea separator may be tethered to one or more land based objects.

In another aspect, the application provides a subsea fluid separator that meets all required American Petroleum Institute ("A.P.I.") tolerances. In another aspect, the fluid separator may have greater tolerances than the corresponding A.P.I. tolerances.

In another aspect, the application provides a fluid separator operationally configured for deep water or ultra deep water operation, the separator having any number of fluid inlets and fluid outlets as desired.

In another aspect, the application provides a subsea fluid separator including an internal pressure ranging from vacuum up to about 690 bar (about 10000 psi) during use.

In another aspect, the application provides a subsea fluid separator operationally configured to receive a liquid/gas mixture and discharge gas-free fluid there from.

In another aspect, the application provides a deep water or ultra deep water fluid separator defined by a cylindrical housing constructed from a metal alloy, the housing wall comprising a thickness of about fifteen percent or more of the outer diameter of the housing.

In another aspect, the application provides a subsea fluid separator defined by a cylindrical housing and end caps having a rounded outer surface.

Discussion of the System and Method

To better understand the novelty of the subsea fluid separator and method of use thereof, reference is hereafter made to the accompanying drawings. With reference to FIG. 1, a simplified illustration of the present subsea fluid separator assembly 10 (hereafter "separator") is provided. In general, the separator 10 is operationally configured to receive a fluid stream (represented by arrow 12) at inlet 14 wherein the fluid stream 12 suitably contacts a deflector means 16 within the separator 10, the deflector means 16 being operationally configured to promote the separation of gas out from the fluid stream 12. Suitably, the separator 10 is oriented in a manner effective for separated gas to rise within the separator 10 for venting through a gas outlet 18. Non-gaseous fluids are suitably discharged via non-gaseous outlet 20.

For subsea operations, the separator 10 suitably lies in fluid connection with a pump means or vacuum forming device via the non-gaseous outlet 20. In one example, the separator 10 may be implemented subsea to remove one or more gases from a fluid stream 12 prior to the fluid stream 12 reaching a pump (exposure to continuous volumes of gas may ultimately damage or otherwise compromise the integrity of a pump). In another example, a suitable separator 10 may be employed subsea for separating gas from other flowable non-gaseous fluids in a fluid stream 12 prior to the non-gaseous fluids being discharged to the surface.

In one implementation, the separator 10 suitably includes a liquid/vapor separator operationally configured to separate multi-phase fluids, for example, hydrocarbon products from associated solids and water. In another implementation, the separator 10 is operationally configured to separate a gas phase from a liquid phase and/or an oil phase from a water phase. Depending on the particular purpose of the separator 10, e.g., the depth of operation and/or fluid separation requirements, the separator 10 may be built to scale. In one embodiment, the separator 10 may include a gas buster as understood to persons of ordinary skill in the art of petroleum operations. Although gas busters are typically used to vent out gas in return lines to prevent gas from entering a liquid holding tank, the present separator 10 is operationally configured to operate upstream of a pump to vent out gas from the fluid stream 12 to prevent gas from flowing to the pump.

Suitably, the separator 10 includes a housing defined by an outer surface 22 and an inner surface 24, the wall thickness of the housing varying as desired. The separator 10 is operationally configured to work off gravity whereby the fluid stream inlet 14 and non-gaseous fluid outlet 20 are located along the housing wall in a manner effective whereby fluid entering the separator 10 flows downward contacting the deflector means 16 in a manner effective to separate gas out of the fluid stream 12, the gas effectively rising toward the top of the separator 10 for venting through the gas outlet 18 and the non-gaseous fluid continuing to flow downward toward the bottom of the separator 10 wherein the non-gaseous fluid is discharged via outlet 20. In the event the separator 10 fills with non-gaseous fluid, the separator 10 is suitably fitted with a sealing means operationally configured to prevent non-gaseous fluid from exiting the separator through the gas outlet 18.

Although the separator 10 is not necessarily limited to a particular design, one suitable separator 10 includes a cylindrical housing defined by (1) a first end cap 26 operationally configured to seal the separator 10 housing at a first end, and (2) a second end cap 28 defined by a gas outlet 18 there through, the second end cap 28 being operationally configured to seal the separator 10 housing at a second end, and vent gas through the gas outlet 18.

Figure 2:
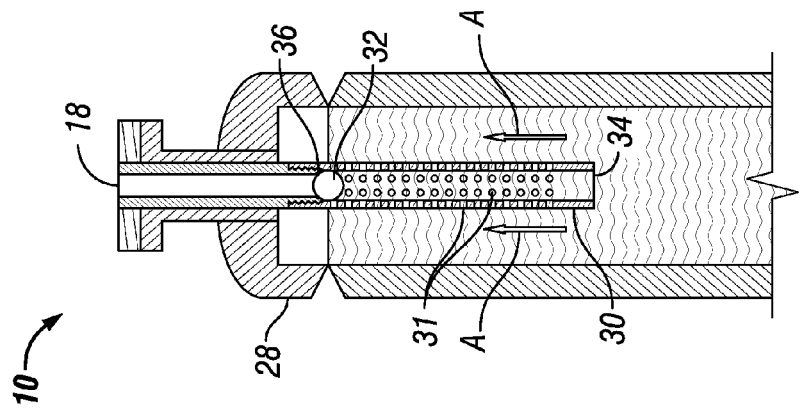
FIG. 2 illustrates a partial sectional view of the separator of FIG. 1 wherein the non-gaseous fluid level is below the valve sealing means and wherein the valve sealing means is in a non-sealed position.
Figure 3:
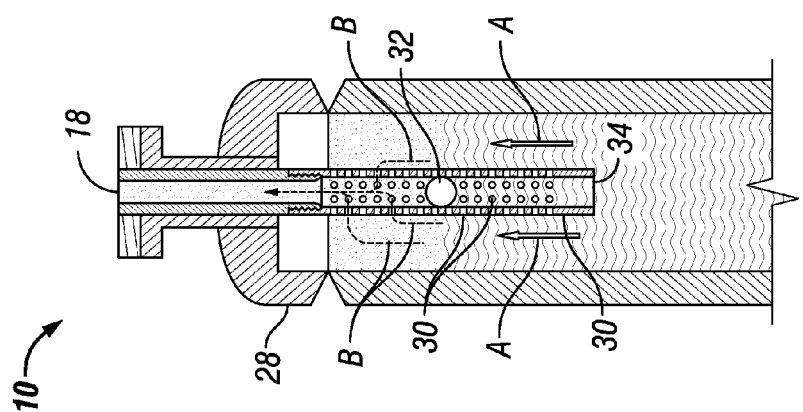
FIG. 3 illustrates a partial sectional view of the separator of FIG. 1 wherein the volume of non-gaseous fluid within the separator is greater than the volume of non-gaseous fluid of FIG. 2, the valve sealing means being in a non-sealed position.
Figure 4:
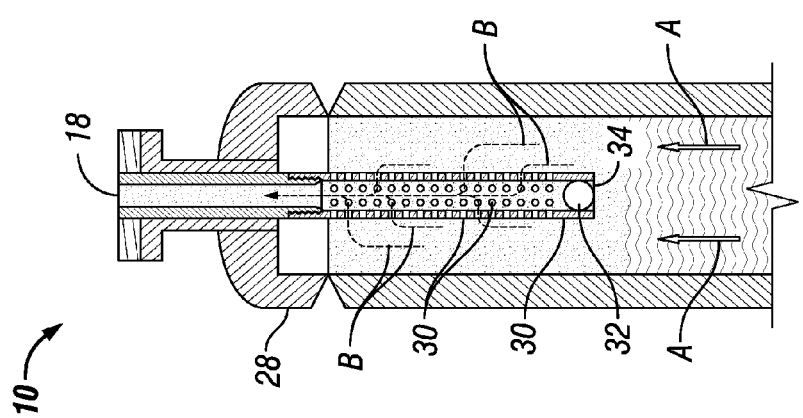
FIG. 4 illustrates a partial sectional view of the separator of FIG. 1 wherein the valve sealing means is in a sealed position.

Turning to FIGS. 2-4, the second end cap 28 is suitably fitted with a sealing means operationally configured to respond to non-gaseous fluid levels within the separator 10. As shown, the sealing means is provided as a ball valve assembly including a perforated tubular member 30 and a ball 32 contained therein, the ball 32 being movable along the interior of the tubular member 30. Suitably, the ball valve assembly lies in fluid communication with the gas outlet 18 in a manner effective for gas to vent out of the separator 10 via gas outlet 18 while preventing non-gaseous fluid from exiting there through.

The tubular member 30 suitably includes a closed end 34 for supporting the ball 32 at a resting position therein when the non-gaseous fluid level within the separator 10 is equal to or below the closed end 34. As shown, the tubular member 30 suitably includes one or more perforations 31 each having a size effective to permit gas and non-gaseous fluid to pass there through. Although the separator 10 and accompanying tubular member 30 may be built to scale, the one or more perforations 31 of the tubular member 30 are suitably arranged along the tubular member 30 in a manner effective to provide uninhibited fluid flow in and out of the tubular member 30. For example, as non-gaseous fluid within the separator 10 rises (see arrows "A"), gas in the separator 10 is suitably forced through the tubular member 30 and gas outlet 18 (see arrows "B"). Depending on the particular implementation of the separator 10, the surface area of the tubular member 30 may be less than, equal to, or greater than area of the perforations 31 there through, and may include perforations 31 of various size and shape allowing for desired operation of the ball valve assembly. As shown, the one or more perforations 31 may include substantially round holes. In another embodiment, the one or more perforations 31 may be provided as slits.

With attention to FIG. 3, the one or more perforations 31 are suitably disposed along the tubular member 30 in a manner effective for non-gaseous fluid to flow in and out of the tubular member 30 in a manner effective for the non-gaseous fluid level within the tubular member 30 to substantially correspond to the non-gaseous fluid level in the surrounding separator 10. As illustrated, the ball 32 is operationally configured to float upon the non-gaseous fluid in a manner effective for the ball 32 to rise and drop according to the level of non-gaseous fluid within the separator 10.

Suitably, the ball 32 is constructed from one or more buoyant materials effective to maintain the upper portion of the ball 32 above the surface level of the non-gaseous fluid. In the event the separator 10 becomes substantially full of non-gaseous fluid, the ball 32 is suitably operationally configured to rise within the tubular member 30 to form a seal between the separator 10 and gas outlet 18 at the seat 36, which is disposed along the periphery of the opening of the gas outlet 18 (see FIG. 4). As the non-gaseous fluid level within the separator 10 drops, the ball 32 drops from a sealed position at seat 36 opening the gas outlet 18 for further venting of any available gas there through.

Although not limited to a particular material, the tubular member 30 is suitably constructed from one or more metals. In one suitable embodiment, the tubular member 30 is constructed from stainless steel. In another suitable embodiment, the tubular member 30 is constructed from carbon steel.

A suitable ball 32 is constructed from one or more materials effective to withstand an internal fluid pressure up to about 690 bar (about 10000 psi). Suitable ball materials include but are not necessarily limited to one or more metals, plastics, rubbers, composite materials, and combinations thereof providing a ball 32 effective to float on methanol and methanol based solutions. In deep water or ultra deep water operation, a suitable ball 66 may be a solid ball constructed from polytetrafluoroethylene. In another embodiment, a suitable ball 32 may be a solid ball constructed from a thermoplastic. In another embodiment, a ball 66 operationally configured to float on methanol and methanol based solutions may include a solid ball constructed from ultra-high-molecular-weight polyethylene ("UHMW"). For subsea salt water applications, if a ball 32 floats on fresh water, the ball 32 may be implemented for use with a salt water based fluid mixture.

As shown in the simplified illustration of FIG. 1, the inlet 14, gas outlet 18, and non-gaseous fluid outlet 20 are operationally configured to releasably and sealably attach to conduit commonly used in subsea operations. In subsea operations, including deep water and ultra deep water applications, the inlet 14 and non-gaseous outlet 20 are suitably operationally configured to releasably and sealably attach to heavy wall pipe for both (1) delivering a fluid stream 12 to the separator 10 and for (2) delivering a non-gaseous fluid stream 13 to a vessel, pump or vacuum forming device. The gas outlet 18 is suitably operationally configured to releasably and sealably attach to coiled tubing, subsea umbilicals, and combinations thereof suitable for deep water and ultra deep water applications. Suitable conduit for use with coil reels includes coiled tubing as common in petroleum operations. Suitable coiled tubing for connecting to the separator 10 in subsea applications has an outer diameter ranging from about 3.81 cm to about 7.4 cm (about 1.5 inches to about 2.9 inches). In another embodiment, suitable coiled tubing for connecting to the separator 10 in subsea applications includes an outer diameter of about 6.05 cm (about 2.38 inches). In addition, the inlet 14 and outlets 18, 20 may be provided with emergency high pressure quick disconnects, referred to as "hot stabs" by persons of ordinary skill in the art of subsea pumping operations. In one aspect, suitable emergency quick disconnects may be employed to prevent ambient water ingress into the separator 10. In another aspect, the emergency quick disconnects may be employed to allow the respective conduits to release from each of the inlet 14 and outlets 18, 20 as desired. The separator 10 may also be fluidly connected to a manifold or like device at the inlet 14.

With reference to FIG. 5, the separator 10 may also be housed within a frame 38 that is operationally configured to (1) protect the separator 10 from destructive type impacts, (2) support the separator 10 in a substantially upright position on the sea floor for suitable fluid flow therethrough, and (3) stack the separator 10 upon another subsea framework or component as desired. Suitably, the frame 38 is provided as a cubical or rectangular type metal framework having a substantially planar bottom surface for stacking purposes or for assisting in maintaining the separator 10 in a substantially upright position during subsea operation. Suitably, the separator 10 is joined to the frame 38 via releasable fasteners such as bolts and the like. In another embodiment, the separator 10 may permanently fixed to the frame 38, e.g., via welds. In still another embodiment, the separator 10 may be fixed to the frame 38 via a combination of releasable fasteners and welds as desired.

As stated above, a suitable subsea separator 10 may be built to scale. For subsea operations at a depth up to about 2195 meters (about 7200 feet), a suitable separator 10 is provided in the simplified illustrations of FIGS. 5-11, with correlating dimensional information listed in Table 1 below.

TABLE 1

| | | Distance |
|---|---|---|
| FIG. 5 | A | About 5.3 m (about 17.4 feet) |
| FIG. 6 | A | About 277 cm (about 109 inches) |
| | B | About 91.7 cm (about 36.1 inches) |
| | C | About 73.9 cm (about 29.1 inches) |
| | D | About 96.2 cm (about 37.88 inches) |
| | E | About 35.1 cm (about 13.81 inches) |
| | F | About 45.7 cm (about 18 inches) |
| | G | About 35.1 cm (about 13.81 inches) |
| | H | About 53.8 cm (about 21.19 inches) |
| | I | About 2.97 cm (about 1.17 inches) |
| | J | About 81.3 cm (about 32 inches) |
| | K | About Ø 23.8 cm (about Ø 9.38 inches) |
| | L | About 16.2 cm (about 6.38 inches) |
| | M | About 16.2 cm (about 6.38 inches) |
| FIG. 7 | A | About Ø 50.8 cm (about Ø 20 inches) |
| | B | About Ø 35.6 cm (about Ø 14 inches) |
| FIG. 8 | A | About Ø 2.0 cm (about Ø 0.79 inches) |
| | B | About Ø 1.4 cm (about Ø 0.55 inches) |
| | C | About Ø 16.2 cm (about Ø 6.38 inches) |
| | D | About 1.0 cm (about 0.39 inches) |
| | E | About 0.438 cm (about 0.17 inches) |
| FIG. 9 | A | About 30.5 cm (about 12 inches) |
| | B | About 4.44 cm (about 1.75 inches) |
| | C | About 15.9 cm (about 6.25 inches) |
| | D | About 29.2 cm (about 11.5 inches) |
| | E | About 10.16 cm (about 4.00 inch) ANSI 900# Long Weld Neck Flange |
| FIG. 10 | A | About 38.1 cm (about 15 inches) |
| | B | About 24.77 cm (about 9.75 inches) |
| | C | About 5.6 cm (about 2.19 inches) |
| | D | About 30.5 cm (about 12 inches) |
| | E | About 15.2 cm (about 6.00 inch) ANSI 900# Long Weld Neck Flange |
| FIG. 11 | A | About 11.43 cm (about 4.5 inches) |
| | B | About 50.8 cm (about 20 inches) |
| | C | About 15.2 cm (about 6.00 inch) ANSI 900# Blind Flange |
| | D | About 10.2 cm (about 4 inches) Pipe |
| | E | Drill as many holes as possible; each hole about Ø 0.16 cm (about Ø 0.063 inches) |

Suitably, the separator 10 described in Table 1 may be constructed from 4130 alloy steel. The end caps 26, 28, the inlet 14, and outlets 18, 20 are suitably welded to the separator 10 housing along weld joints as illustrated. The inner diameter of the separator 10 is about 35.6 cm (about 14 inches), and the separator 10 has a maximum fluid volume capacity up to about 284 liters (about 75 gallons) at atmospheric pressure. The outer diameter of the separator 10 is about 50.8 cm (about 20 inches).

Figure 12:
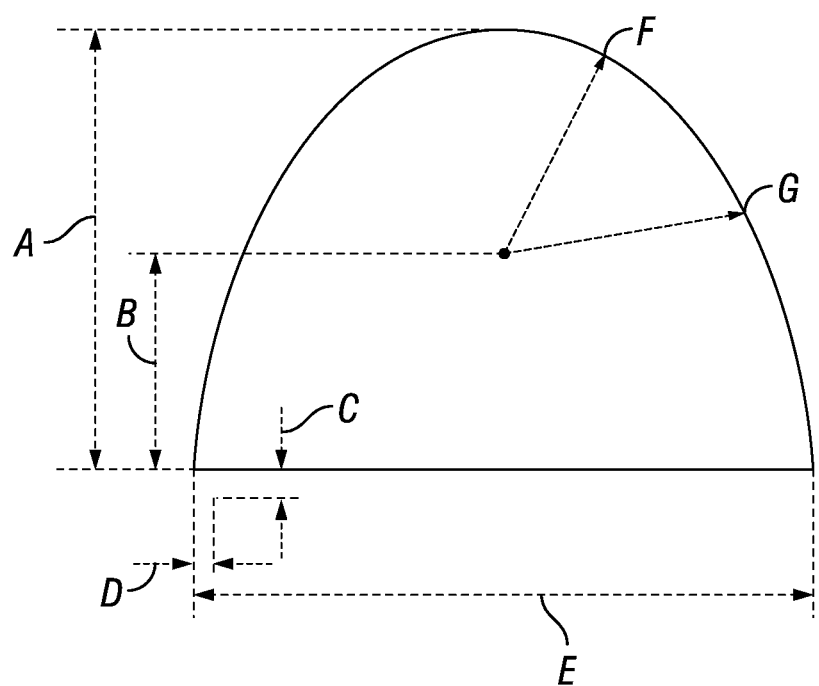
FIG. 12 illustrates a plan view of a deflector means of the separator of FIG. 6.

With reference to FIG. 12, a suitable deflector means 16 may include a baffle type member or other plate type member extending from the inner surface 24 of the separator 10 and operationally configured to promote separation of gases from non-gaseous fluid as the fluid stream 12 flows toward the bottom of the separator 10. Each deflector means 16 suitably includes the dimensions as listed in Table 2.

TABLE 2

| A | About 24.1 cm (about 9.5 inches) |
|---|---|
| B | About 11.8 cm (about 4.63 inches) |
| C | About 1.5 cm (about 0.60 inches) |
| D | About 1.2 cm (about 0.46 inches) |
| E | About 34.3 cm (about 13.5 inches) |
| F | Radius of about 12.4 cm (about 4.88 inches) |
| G | Radius of about 33.2 cm (about 13.06 inches) |

In one embodiment, the deflector means 16 may be constructed from one or more metals. In another embodiment, the deflector means 16 may be constructed from steel alloy. In another embodiment, the deflector means 16 may be constructed from carbon steel plate material that may be riveted, bolted, or welded to the inner surface 24 of the separator 10 housing. In still another embodiment, the deflector means 16 may be constructed from A36 steel as established by the standards organization ASTM International, with headquarters in West Conshohocken, Pa.

The separator 10 of FIGS. 5-12 is operationally configured for use subsea and at an ambient external hydrostatic pressure up to about 463 bar (about 6708 psi). For example, in the Gulf of Mexico, this equates to subsea installation of the separator 10 at a depth up to about 4572 meters (about 15000 feet). Suitably, the separator 10 of FIGS. 5-12 is operationally configured to operate at an internal fluid pressure ranging from vacuum up to about 690 bar (about 10000 psi). Thus, the separator 10 of FIGS. 5-12 is operationally configured to operate under a differential pressure including a greater external hydrostatic pressure on the separator 10 than the internal pressure of the separator 10, and vice versa. At maximum external hydrostatic pressure and maximum internal pressure, the pressure differential of the separator 10 is about 227 bar (about 3292 psi). Likewise, the separator 10 may operate under vacuum at an ambient external hydrostatic pressure up to about 463 bar (about 6708 psi).

The invention will be better understood with reference to the following non-limiting example, which is illustrative only and not intended to limit the present invention to a particular embodiment.

Example 1

In a first non-limiting example, the separator 10 is installed in the Gulf of Mexico at a depth producing an ambient external hydrostatic pressure of about 126 bar (about 1833 psi). The inlet 14 is fluidly connected to a subsea pipeline end termination wherein the separator 10 is operationally configured to receive fluid from the pipeline and separate gas out from the non-gaseous fluid. The non-gaseous outlet 20 is fluidly connected to a subsea pump providing a vacuum resulting in an internal pressure of the separator 10 of about 3.5 bar (about 50 psi). During separator 10 operation, the external hydrostatic pressure is about 36.66 times greater than the internal pressure of the separator 10.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

We claim:

1. A subsea separator, comprising:
    a housing having an inlet for receiving a fluid mixture, a non-gaseous fluid outlet located along the housing at a point lower than the inlet, and a gas outlet located along the housing at a point higher than the inlet;
    baffle type members located within the housing for acting on fluid entering the housing; and
    ball valve assembly located within the housing and in communication with the gas outlet for preventing non-gaseous fluid from exiting the housing through the gas outlet, the ball valve assembly being operationally configured to open and seal the gas outlet based on the volume of non-gaseous fluid within the separator;
    wherein the separator is operationally configured to operate under vacuum.

2. The separator of claim 1 wherein the separator has a pressure differential of about 227 bar (about 3292 psi).

3. The separator of claim 1 wherein the separator is operationally configured to operate at an internal fluid pressure ranging from vacuum up to about 690 bar (about 10000 psi) in a subsea environment including an external hydrostatic pressure up to about 463 bar (about 6708 psi).

4. The separator of claim 2 wherein the separator is operationally configured to operate at an internal fluid pressure ranging from vacuum up to about 690 bar (about 10000 psi).

5. The separator of claim 1 wherein the housing has a substantially uniform wall thickness.

6. The separator of claim 1 wherein the housing is constructed from carbon steel.

7. The separator of claim 1 wherein the ball valve assembly has (1) a perforated tubular member releasably attached at the gas outlet and in fluid communication with the gas outlet, and (2) a ball contained within the tubular member, the ball being operationally configured to (a) float upon the non-gaseous fluid within the separator, and (b) form a seal at the gas outlet effective to seal the second end of the housing.

8. The separator of claim 7 wherein the ball is operationally configured to float on methanol.

9. The separator of claim 7 wherein the ball is a solid ball constructed from ultra-high-molecular-weight polyethylene.

10. The separator of claim 1 wherein the baffle type members include outer edges.

11. The separator of claim 1 further including an external frame attached thereto.

12. The separator of claim 1 wherein the separator is operationally configured to be fluidly connected to a subsea pump via the non-gaseous fluid outlet.

13. The separator of claim 1 wherein the separator includes an elongated cylindrical housing having externally rounded ends.

14. A deep water separator for separating gas from a liquid/gas mixture comprising:
    a cylindrical housing having a substantially uniform wall thickness;
    a first end cap for sealing the housing at a first end and a second end cap for sealing the periphery of the housing at a second end, the second end cap having a gas outlet there through;
    a fluid inlet located along the housing for receiving a liquid/gas mixture there through;
    a non-gaseous fluid outlet located along the housing at a point lower than the fluid inlet, the non-gaseous fluid outlet being effective for discharging non-gaseous fluid there through;
    baffle type members having outer edges extending from the inner surface of the housing to a point within the housing, the outer edges of the baffle type members being located between the fluid inlet and the non-gaseous fluid outlet; and
    a ball valve assembly located within the housing and fluidly connected to the gas outlet, the ball valve assembly being operationally configured to open and seal the gas outlet based on the volume of non-gaseous fluid within the separator.

15. The separator of claim 14 wherein the housing and end caps are constructed from a metal alloy.

16. The separator of claim 14 wherein the separator is operationally configured to operate at an internal fluid pressure ranging from vacuum up to about 690 bar (about 10000 psi) in a subsea environment including an external hydrostatic pressure up to about 463 bar (about 6708 psi).

17. The separator of claim 14 wherein the liquid/gas mixture includes methanol.

18. A method of separating gas from a liquid/gas mixture in a subsea environment at an external hydrostatic pressure up to about 463 bar (about 6708 psi), comprising:
    providing a separator including
        a housing having an inlet for receiving a liquid/gas mixture, a non-gaseous fluid outlet located along the housing at a point lower than the inlet, and a gas outlet located along the housing at a point higher than the inlet;
        baffle type members having outer edges extending from the inner surface of the housing to a point within the housing lower than the inlet and above the non-gaseous fluid outlet for acting on the liquid/gas mixture entering the housing; and
        a ball valve assembly located within the housing and in communication with the gas outlet for preventing non-gaseous fluid from exiting the housing through the gas outlet, the ball valve assembly being operationally configured to open and seal the gas outlet based on the volume of non-gaseous fluid within the separator;
        wherein the separator is operationally configured to operate under vacuum;
    installing the separator subsea to a depth producing an external hydrostatic pressure up to about 463 bar (about 6708 psi):
    fluidly connecting the separator to (1) a fluid source containing a liquid/gas mixture and (2) a pump; and
    receiving a fluid/gas mixture from the fluid source wherein the fluid/gas mixture contacts the baffle type members to separate gas out of the fluid/gas mixture.

19. The method of claim 18 further including discharging gas past the ball valve assembly through the gas outlet and discharging nongaseous fluid through the non-gaseous fluid outlet.

20. The method of claim 18 wherein the liquid/gas mixture includes methanol.

\* \* \* \* \*